United States Patent
Jouhier

(10) Patent No.: US 10,970,084 B2
(45) Date of Patent: Apr. 6, 2021

(54) APPLICATION DEPLOYMENT

(71) Applicant: Sage (UK) Ltd, Newcastle Upon Tyne (GB)

(72) Inventor: Bruno Claude Jean-Marie Jouhier, Paris (FR)

(73) Assignee: SAGE (UK) LTD., Newcastle Upon Tyne (GB)

( * ) Notice: Subject to any disclaimer, the term of this patent is extended or adjusted under 35 U.S.C. 154(b) by 0 days.

(21) Appl. No.: 16/413,501

(22) Filed: May 15, 2019

(65) Prior Publication Data

US 2019/0391823 A1    Dec. 26, 2019

(30) Foreign Application Priority Data

May 16, 2018  (GB) .................................. 1807929

(51) Int. Cl.
  *G06F 9/445*  (2018.01)
  *G06F 8/41*   (2018.01)
  *G06F 8/60*   (2018.01)

(52) U.S. Cl.
  CPC ............ *G06F 9/44505* (2013.01); *G06F 8/41* (2013.01); *G06F 8/60* (2013.01); *G06F 9/44526* (2013.01)

(58) Field of Classification Search
  CPC .......... G06F 8/41; G06F 8/60; G06F 9/44505; G06F 9/44526
  See application file for complete search history.

(56) References Cited

U.S. PATENT DOCUMENTS

| | | | |
|---|---|---|---|
| 6,637,020 B1* | 10/2003 | Hammond | G06F 8/34 717/107 |
| 7,185,325 B2* | 2/2007 | Boyle | G06F 9/4492 717/147 |
| 7,392,522 B2* | 6/2008 | Murray | G06F 9/44526 717/174 |
| 8,381,177 B2* | 2/2013 | Cabillic | G06F 9/44552 717/108 |
| 8,533,692 B2* | 9/2013 | Crasovan | G06F 8/70 717/140 |
| 8,762,976 B2* | 6/2014 | Kaplan | G06F 9/44526 717/106 |
| 9,542,173 B2* | 1/2017 | Dehmann | G06F 11/36 |
| 2002/0178435 A1 | 11/2002 | Allison | |

(Continued)

OTHER PUBLICATIONS

Search Report issued in connection with Great Britain Patent Application No. GB 1807929.3, dated Nov. 15, 2018.

*Primary Examiner* — Douglas M Slachta
(74) *Attorney, Agent, or Firm* — Burns & Levinson LLP; George Chaclas; Daniel McGrath

(57) ABSTRACT

A method of deploying an application is provided. The method includes publishing a first code package to a package registry and publishing one or more further code packages to the package registry. The first code package can include code specifying a first definition of a class and at least one of the one or more further code packages comprises code specifying a further definition of the class. The further definition of the class comprises prototype merging so that on compilation the first definition of the class and the extended definition of the class are loaded as a single class, and module augmentation so that the first and extended definitions of the class are treated as a single merged class by development tools.

11 Claims, 5 Drawing Sheets

(56) References Cited

U.S. PATENT DOCUMENTS

| | | | |
|---|---|---|---|
| 2005/0022161 A1* | 1/2005 | Burger | G06F 8/70 |
| | | | 717/108 |
| 2006/0206905 A1* | 9/2006 | Werner | G06F 9/449 |
| | | | 719/330 |
| 2010/0153915 A1 | 6/2010 | Schneider | |
| 2010/0262956 A1 | 10/2010 | Okada | |
| 2013/0067058 A1* | 3/2013 | Bohm | G06F 9/45504 |
| | | | 709/224 |
| 2014/0137079 A1* | 5/2014 | Witteborg | G06F 8/71 |
| | | | 717/120 |
| 2014/0282442 A1* | 9/2014 | Hoban | G06F 8/437 |
| | | | 717/143 |
| 2015/0089470 A1* | 3/2015 | Shakespeare | G06F 8/51 |
| | | | 717/108 |
| 2016/0294928 A1* | 10/2016 | Chmielewski | G06F 9/45529 |
| 2018/0262388 A1* | 9/2018 | Johnson | H04L 41/28 |

\* cited by examiner

S401 — Write base code in TypeScript including base definition of class ABC

S402 — Write add-on code in TypeScript including further definition of class ABC using decorator function to implement prototype merging combining base definition of class ABC with further definition of class ABC and implementing module augmentation using "declare module" instruction S403 — Transpile base code to JavaScript and publish to package registry S404 — Transpile add-on code to JavaScript and publish to package registry S405 — Assemble application source code in accordance with application manifest file S406 — Communicate assembled source code to application server S407 — Compile and load assembled source on application server using JavaScript Engine S408 — Run compiled application on application server

Fig 4

APPLICATION DEPLOYMENT

INCORPORATION BY REFERENCE TO ANY PRIORITY APPLICATIONS

Any and all applications for which a foreign or domestic priority claim is identified in the Application Data Sheet as filed with the present application are hereby incorporated by reference under 37 C.F.R. § 1.57.

BACKGROUND

The present application relates to systems and method for deploying applications. In particular, but not exclusively, embodiments of the present application relate to techniques for deploying extensible applications developed by multiple independent developers.

Increasingly, it is desirable to develop modern enterprise class software applications so that they are "extensible". This means that they are created in such a way that they can be modified/extended to meet the particular needs of different end users. This modification is usually achieved by incorporating into the "base code" of the application (the software defining the core functionality of the application) "add-on" code which modifies or extends the core functionality of the application. Extensible development means that different instances of the application can be readily customised and deployed for different users.

Commonly, for large and complex applications, multiple sections of add-on code may be used. Typically, different sections of add-on code are developed by different third-party developers.

Accordingly, when developing and deploying such applications, "decoupled" development techniques are typically employed whereby different sections of add-on code are developed separately from the base code and different applications, comprising different selections of add-on code, are assembled and deployed independently from each other.

Modern software development techniques, such as "just-in-time" compiling, whereby the code is loaded and compiled during deployment enable decoupled development to be readily and conveniently undertaken.

When developing large and complex applications, particularly applications that comprise code developed by a number of different parties can consider the risk of conflicts arising between the base code and subsequently developed code (e.g., add-on code). This risk is generally greater, the more sections of add-on code that are used in a deployed application and the more frequently the sections of add-on code and the base code are updated.

To improve productivity, facilitate self-documentation, to enhance productivity and to reduce the chance of conflicts arising, base code and add-on code can be written using a statically typed language such as C#. Static typing, whereby variable typing is checked as part of the compilation process, reduces the chance of type errors in the application code causing run-time errors when the application is deployed.

However, using a statically typed language imposes restrictions on the way in which code is developed. For example, it is often useful for functionality specified in a class in the base code to be extended in add-on code.

Software coding features, such as "partial classes," are available in languages such as C# allowing classes defined in one section of code to be extended in another section of code.

However, in languages such as C#, all the code that contributes to a given class must be compiled and linked together into a single assembly. This restriction makes code development in a decoupled development environment, where the base code and add-on code are ideally developed independently of each other, more difficult.

It would be desirable to providing techniques that take advantage of the benefits of static typing whilst reducing the restrictions that static typing normally imposes on decoupled software development.

SUMMARY

In accordance with a first aspect, there is provided a method of deploying an application. The method comprises: publishing a first code package to a package registry; publishing one or more further code packages to the package registry; assembling application source code by combining the first code package with one or more of the further code packages from the package registry in accordance with dependencies specified in an application manifest file. The first code package comprises code specifying a first definition of a class and at least one of the one or more further code packages comprises code specifying a further definition of the class. The further definition of the class comprises prototype merging so that on compilation the first definition of the class and the extended definition of the class are loaded as a single class, and module augmentation so that the first and extended definitions of the class are treated as a single merged class by development tools.

Optionally, the method further comprises writing the first code package and the one or more further code packages in TypeScript.

Optionally, the first code package and the one or more further code packages are transpiled into JavaScript before being published to the package registry.

Optionally, the prototype merging comprises using a decorator function to incorporate, on loading, the code specifying the first definition of the class with the code specifying the further definition of the class.

Optionally, the module augmentation comprises using a TypeScript "declare module" instruction.

Optionally, the method further comprises loading and running the assembled application source code on an application server.

Optionally, the method further comprises loading and compiling the assembled application source code by a JavaScript Engine.

Optionally, the first code package is a base code package specifying base code associated with the application.

Optionally, the one or more further code packages are add-on code packages specifying add-on code specifying further functionality to be selectively included in instances of the application.

In accordance with a second aspect, there is provided a system for deploying an application. The system comprises one or more computing devices having processing functionality and a memory that execute computer-executable instructions that implement a package registry comprising a first code package and one or more further code packages and a package manager operable to assemble application source code by combining the first code package with one or more of the further code packages from the package registry in accordance with dependencies specified in an application manifest file. The first code package comprises code specifying a first definition of a class and at least one of the one or more further code packages comprises code specifying a further definition of the class. The further definition of the class comprises prototype merging so that on compilation the first definition of the class and the extended definition of the class are loaded as a single class, and module augmentation so that the first and extended definitions of the class are treated as a single merged class by development tools.

Optionally, the first code package and the one or more further code packages are originally written in TypeScript.

Optionally, the system further comprises a transpiler adapted to transpile the first code package and the one or more further code packages from TypeScript into JavaScript and publish the transpiled first code package and the one or more further code packages to the package registry. The transpiling can occur prior to publication.

Optionally, the prototype merging comprises using a decorator function to incorporate, on loading, the code specifying the first definition of the class with the code specifying the further definition of the class.

Optionally, the module augmentation comprises using a TypeScript "declare module" instruction.

Optionally, the system further comprises an application server, said application server comprising an engine, wherein the application server is operable to receive the assembled application source code from the package registry and the engine is adapted to load and run the assembled application code.

Optionally, the engine is a JavaScript engine.

In accordance with certain embodiments, a technique is provided that improves the way in which an extensible application is developed in a decoupled development environment. The technique facilitates "partial classes" to be available for use in applications that are assembled using a package manager. More specifically, partial classes can be implemented across independently developed code packages, whilst still written in a statically typed language (TypeScript) that does not natively support partial classes.

Specifically, the technique allows a class to be partially defined in a base code package, and then extended in an add-on code package whilst enabling development of the add-on code package to be undertaken independently from development of the base code package. From the perspective of a developer developing an add-on code package, the class appears to be extended (for example from a code editor), while the definition of the class in the base code package remains unaffected. Moreover, this development flexibility is provided in a statically typed development environment the use of which reduces the likelihood of conflicts arising between separately developed packages. The use of static typing has further advantages such as typically catching coding errors early, providing enhanced autocompletion in code editors and facilitating code refactoring.

Advantageously, the present technique can be implemented by virtue of minor modifications to the class definition in the add-on code package.

In certain embodiments, the base code package and add-on code package are written in TypeScript before being transpiled to JavaScript. By combining TypeScript with a technique to implement partial classes, advantageously a well-decoupled extensibility model is provided where add-on code packages can very readily used to customise existing classes in a "safe" environment for developers by virtue of the fact TypeScript is statically typed.

C# is a mainstream statically typed language which supports partial classes. However, C# does not allow partial classes to span across code package boundaries. Specifically, C# does not allow a class defined in a base code package published to a package repository to be further defined (extended) in an add-on code package also published to the package repository.

Other languages that support partial classes (for example Ruby) are typically not statically typed.

Various further features and aspects of the present application are defined in the claims.

BRIEF DESCRIPTION OF THE DRAWINGS

Embodiments of the present application will now be described by way of example only with reference to the accompanying drawings where like parts are provided with corresponding reference numerals and in which:

FIG. 4 provides a flow diagram of a method in accordance with embodiments of the invention, and FIG. 5 provides a simplified schematic diagram of a system of implementing a technique in accordance with certain embodiments of the invention.

DETAILED DESCRIPTION OF THE PREFERRED EMBODIMENT

Figure 1:
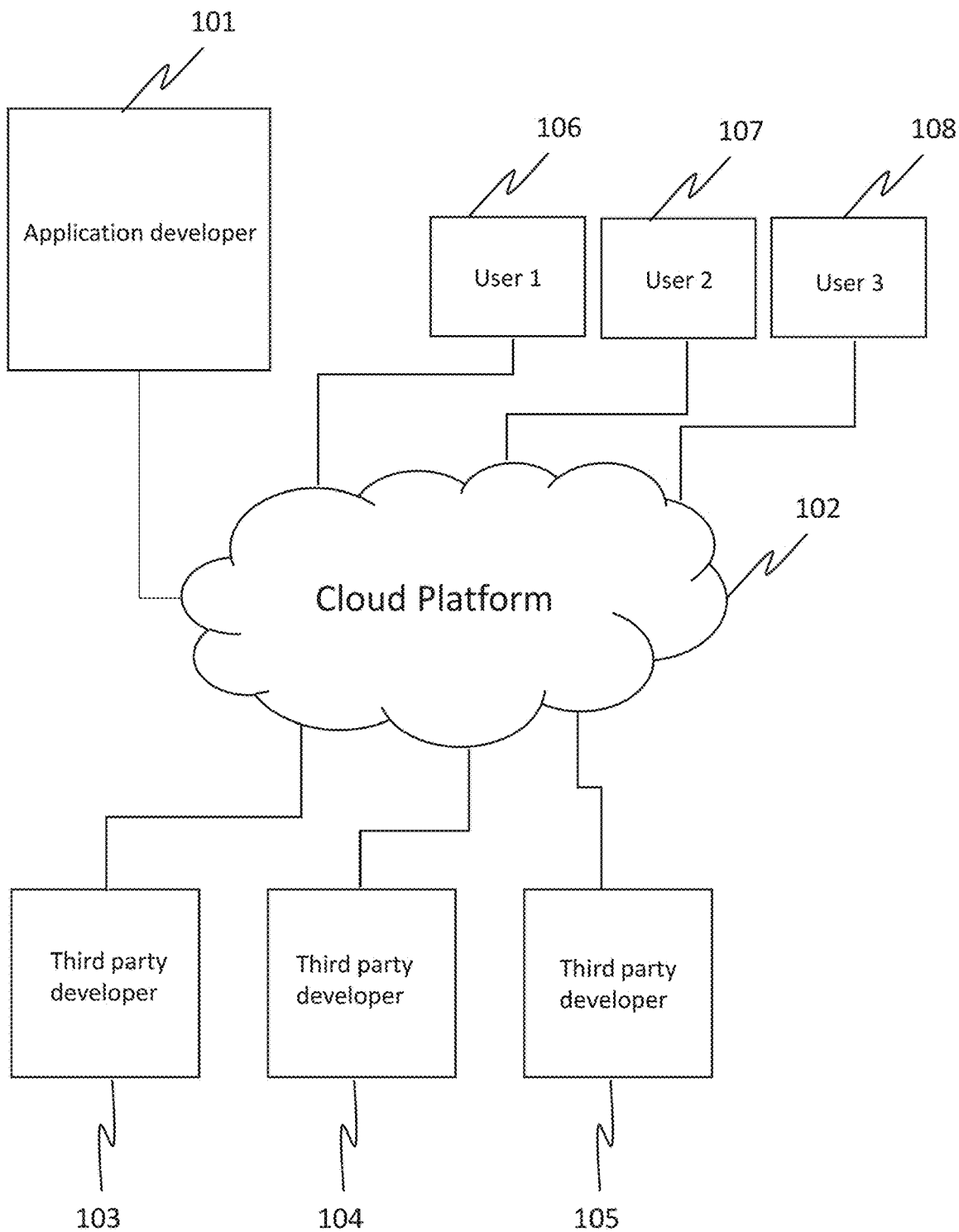
FIG. 1 provides a schematic diagram of an application development environment.

FIG. 1 provides a schematic diagram depicting in simplified form the way in which instances of a modern enterprise class software application are developed and deployed for multiple different users.

An application developer 101 develops and publishes the resources (e.g., software code and data libraries) associated with the application to a "cloud platform" 102. These resources can be referred to as the application "base code" as they provide the core functionality associated with the application.

Third-party developers 103, 104, 105 develop "add-on" resources (e.g., add-on software code and data libraries) which extend or optimise the application for particular users. For example, the base code may relate to accounting software and an add-on resource developed by a first of the third-parties may provide add-on software code or data libraries which optimises the accounting application for users who use the accounting application in a retail environment. Another add-on resource may provide add-on software or data libraries which optimise the accounting application for users who use the accounting application in a manufacturing environment. A further add-on resource may provide add-on software and data libraries which relate to accounting practices in a particular country or jurisdiction. The third-party developers 103, 104, 105 also publish the add-on resources to the cloud platform 102.

Users of the application 106, 107, 108 download the base code provided by the application developer 101 along with appropriate add-on resources provided by the third-party developers 103, 104, 105 and assemble and compile a version of the application in accordance with their requirements. Some users of the application may assemble a version of the application which includes the base code and add-on resources from multiple third-party developers. Moreover, the base code and the add-on resources may themselves be dependent on resources from other sources. Accordingly, any given deployment of the application may comprise software code and data libraries from multiple different sources and which may typically have been developed independently.

In order to manage the development and deployment of such applications a package manager can be used. A package manager is a computer-implemented tool that enables different components ("packages") of an application to be stored in a central repository (the package registry) and then brought together (assembled) to create source code which can be compiled to provide instances of the application. The package manager manages "dependencies," e.g., tracking which packages are dependent on other packages to correctly work.

Figure 2:
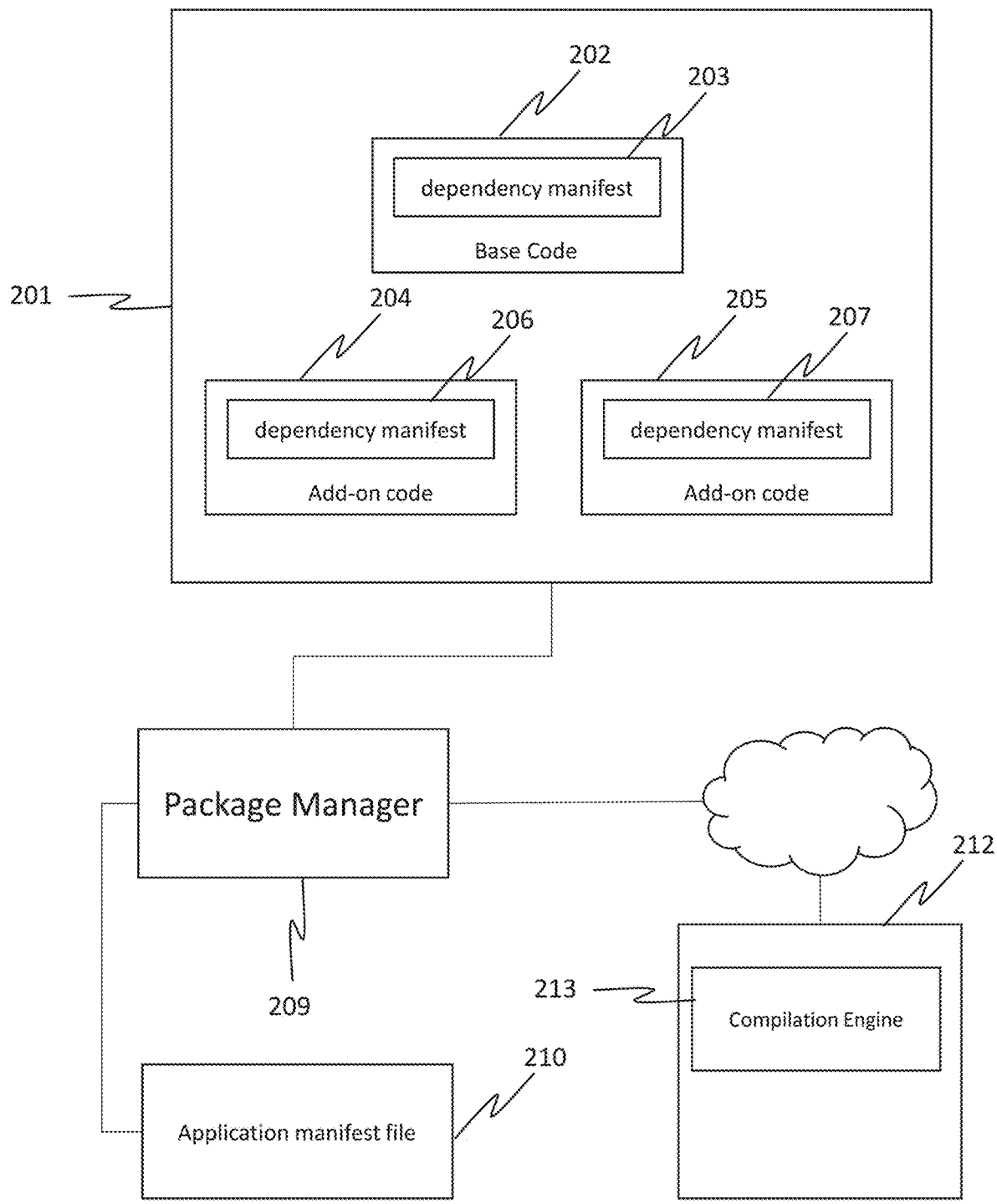
FIG. 2 provides a simplified schematic diagram providing a simplified representation of a system for assembling and compiling application code using a package manager and for deploying an instance of the application on an application server.

FIG. 2 provides a simplified schematic diagram providing a simplified representation of a system for assembling and compiling application code using a package manager and for deploying an instance of the application on an application server.

A package registry 201 is provided. In accordance with conventional techniques, code packages relating to an application are uploaded and stored in the package registry 201. The package registry 201 may be implemented in one or more computing devices that are associated with processing resources and memory resources that cause the execution of computer-executable instructions for implementation of the package registry.

Stored in the package registry 201 is a base code package 202 comprising data providing the base code of an application. The base code package 202 includes a dependency manifest file 203 which specifies resources (e.g., code or data files) from other packages on which the base code depends, that is, data from other packages which must be included with the base code for the base code to be successfully compiled into the application code.

Also stored in the package registry 201 is a first add-on code package 204 and a second add-on code package 205. The first and second add-on code packages comprise data providing supplemental code to be added to the base code to produce a version of the application code to be compiled. This add-on code package comprises code that typically extends the functionality of the code in the base code package. Typically, the add-on code package may be developed (written) and tested separately from the base code package.

The first add-on code package 204 comprises a dependency manifest file 206 specifying resources (e.g., code or data files) from other packages on which the supplemental code from the first add-on code package 204 depends. Similarly, the second add-on code package 205 comprises a dependency manifest file 207 specifying resources (e.g., code or data files) from other packages on which the supplemental code from the second add-on code package 205 depends.

The system further comprises a package manager 209 which is adapted to assemble the application code from the code and resources in various packages stored in the package registry. The package manager 209 reads an application manifest file 210 which specifies the dependencies of the application (e.g., the add-on code packages that must be included with the base code for the application to compile in accordance with a user's requirements). The package manager 209 can be implemented in one or more computing devices have processing and memory resources that execute computer-executable instructions for implementing the package manager 209.

The JavaScript code assembled by the package manager 209 in accordance with the application manifest file 210 is received by a server 212 arranged to run the application. The server 212 includes an engine 213 which receives then loads and compiles the JavaScript code from the package manager 209. This compilation is "just in time" (JIT) compilation which is performed while loading JavaScript code.

Many modern object-oriented computer programming languages support the feature of "classes" which define a template for creating "objects".

Usually, the definition of a class is self-contained within a given piece of source code. However, in certain aspects, "partial classes" can be used. A partial class is a class which is defined in two or more places (for example in different parts of a source code or across more than one file). Using partial classes, multiple class definitions are brought together at compile time and the compiler is adapted to convert the multiple class definitions into a single class.

With reference to the development environment described with reference to FIG. 2, to support extensibility and decoupled development, it is desirable that a class defined in the base code package can be extended in the various add-on code packages.

However, using statically typed languages such as C# this is difficult to achieve because the static typing of C# requires that a class definition is compiled and linked in a single assembly. That is, it is not possible to define the same class in different packages.

In accordance with certain aspects of the present application, a technique is provided enabling a statically type language, specifically TypeScript, to be used to enable partial classes to be implemented across package boundaries. TypeScript does not natively support partial classes, however in accordance with certain aspects of the present application writing code in TypeScript can be used to implement a feature which is effectively equivalent to the partial classes feature provided by other statically type languages such as C#. Further, due to the late-binding of code written in TypeScript, and unlike C#, a single class can be defined across more than one code package. On the other hand, unlike other languages in which partial classes might be available but are not statically typed, (e.g., Ruby), static typing can be preserved during development.

Thus, in accordance with the present application, with reference to FIG. 2, the base code package 202 may contain code data which defines a class and one of the add-on code packages, for example the first add-on code package 204 may include code data that specifies further aspects of that class.

The additional class definition code in the first add-on code package 204 can be developed and deployed independently of the base code package 202. When the compilation engine loads and compiles the application code, the aspects of the class defined in the first and second add-on package are compiled as if they were a single class.

Figure 3:
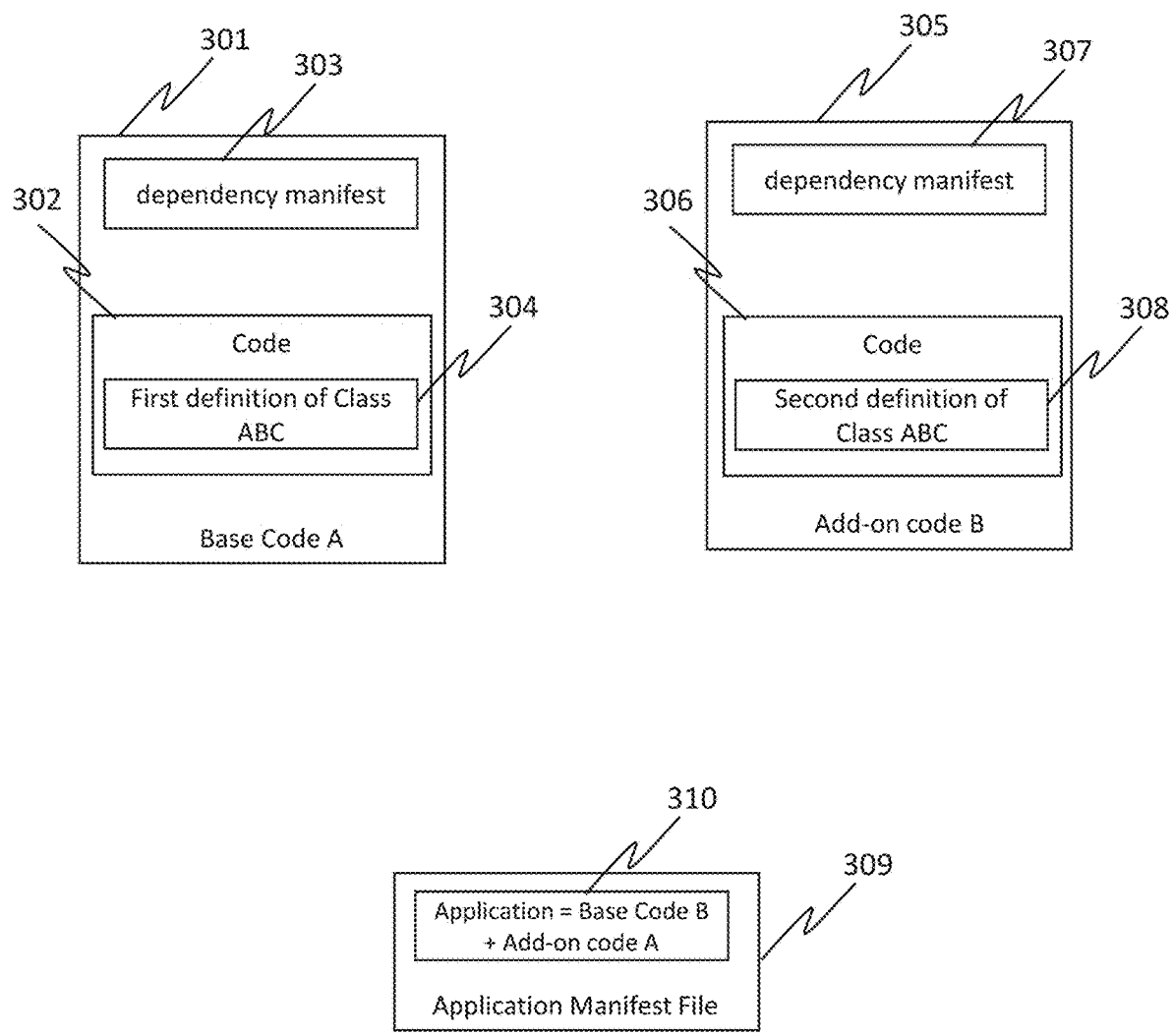
FIG. 3 provides an example of use of a partial class in accordance with example of the invention.

A technique in accordance with certain examples of the invention is described further with reference to FIG. 3.

FIG. 3 depicts part of the content of a package repository of the type described with reference to FIG. 2. Specifically, the package repository includes a base code package A 301 which includes code data 302 providing base code for an application and a dependency manifest file 303. The base code 302 of base code package A 301 includes class definition code data 304 providing a definition of Class ABC 304.

The package registry further includes add-on code package B 305 which includes code data providing add-on code 306 for extending the functionality of the application, and a dependency manifest file 307. The add-on code specifies further functionality to be selectively included in instances of the application. The code data 308 includes class definition code data 308 which provides a further definition of Class ABC 304.

FIG. 3 further shows an application manifest file 309 which includes application dependency code 310 that specifies the application's dependencies. The application dependency code 310 is typically written in JSON and specifies that the application, when assembled by the package manager should include the code from the base code package A 301 combined with add-on code package B 305.

The code in base code package A 301, add-on code package B 305 are written in TypeScript and transpiled to JavaScript when uploaded to a package registry.

In accordance with some embodiments, two specific techniques are employed to implement partial classes across the base code package A 301 and add-on code package B. These two specific techniques are prototype merging and module augmentation.

In order to implement this technique, in the base code package A, in the class definition code data 304 class ABC is defined in the normal way, for example (note, the line code line numbering used in the code fragment below is included simply to allow reference to individual lines of code):

```
1.   export class ABC {
2.     hello( ) { console.log('hello'); }
3.   }
```

This code defines the class "ABC".

In add-on code package B 305, the class definition code data 308 class ABC is further defined using the following code:

```
4.   import { ABC as ABCBase } from 'packageA;
5.   import { extend } from './decorators';
6.
7.   @extend(ABCBase)
8.   export class ABC {
9.     private base = this as any as ABCBase;
10.    world( ) { console.log(this.base.hello( ) + ' world'); }
11.  }
12.
13.  declare module 'packageA' {
14.    interface ABCBase extend ABC { }
15.  }
```

In this class definition, the class ABC is imported from base code package A and aliased locally as "ABCBase" (code line 4.). Further the function "extend" is imported from a decorator definition file (./decorators) (code line 5.).

The "extend" function from the decorator definition file comprises the following code:

```
16.  export function extend(base: Function) {
17.    return function (cla: any) {
18.      Object.getOwnPropertyNames(cla.prototype)
20.        .forEach(k => {
21.          if (k === 'constructor' || k === 'base') return;
22.          if (!base.prototype[k])
23.            base.prototype[k] = cla.prototype[k];
24.        });
25.    };
```

The JavaScript decorator feature (code line 7.) is used to supplement the definition of the class ABC Base code package A to include additional functionality specified in code lines 9. and 10.

By virtue of this coding, "prototype merging" is implemented whereby the functionality of the class ABC defined in the base code package A can be supplemented by code from the add-on code package B 305. When base code package A and the add-on code package B are assembled and then dynamically compiled and loaded, class ABC, although defined in two separate packages, is treated as a single class. More specifically, the two definitions of the class ABC are loaded as a single class.

However, the code from the add-on code package B 305 further includes code lines 13. and 14. which implement a module augmentation action. Module declaration (i.e., the "declare module" instruction) is normally used to declare the data types and functions exported by a module. However, in this instance it is used to add properties and methods to a class exported by another module. This has the effect of altering the definition of class ABC in all code that imports it from package A because the directive modifies package A's ABC class definition by adding to it the properties and methods of class ABC defined in package B.

By virtue of the module augmentation, development tools such as the transpiler, code editor and debugger will treat the two definitions of class ABC as a single merged class.

For example, when writing code in a code editor that imports add-on code package B 305, a developer will "see" the two classes (i.e., the definition of class ABC from base package A and the definition of class ABC from add-on package B) as if they were a single class. For example, in a code editor the developer can input:

```
26.  new ABC( ).hello( );
27.  new ABC( ).world( );
``` and both lines of code will be considered valid even though "hello( )" and "world( )" are functions that come from class definitions in different files. Moreover, in a development environment in which intelligent code completion is implemented, the editor will propose both "hello( )" and "world( )" as possible completions after "new ABC( )" has been entered.

Meanwhile, the extension of the class ABC in add-on code package B has no impact on the definition of the class ABC in the base code package. For example, were a different developer to use the base code package A but not import add-on package B, then they would see no change in the functionality of the class ABC beyond what is defined in the base code package. Moreover, providing the definition of class ABC was not deleted or had any aspect of it deleted, the base code itself can be changed/upgraded without any effect on functionality provided by any add-on modules which further extend the class ABC.

Typically, when using this technique, a policy is naturally enforced whereby functionality can be added to a class definition (in either the base code or add-on code) but, to avoid conflict, cannot be deleted.

FIG. 4 depicts a method in accordance with certain embodiments of the present application. Illustratively, the method may be implemented as a computer-implemented method executed by one or more computing devices having processing resources and memory resources that implement instructions corresponding to the method of FIG. 4 (individually or in concert). At a first step S401, base code is written including a base definition of a class ABC. The base definition of the class is written in the conventional way. The base code is written in TypeScript. At a second step S402, add-on code, supplementing the base code is written including a further definition of the class ABC that extends the functionality of the class. The further definition of the class ABC uses a decorator function to implement prototype merging combining the base definition of class ABC with further definition of class ABC and implements module augmentation using "declare module" instruction. The add-on code is written in TypeScript. At a third step S403, the base code is transpiled from TypeScript to JavaScript and published to a package registry as a base code package. At a fourth step S404, the add-on code is transpiled from TypeScript to JavaScript and published to the package registry as an add-on code package. At a fifth step S405, application source code is assembled by a package manager in accordance with dependencies specified in an application manifest file. The assembly of the application source code includes the base code package and the add-on code package. At a sixth step S406, the assembled code is communicated to an application server and at a seventh step S407 the application server loads and compiles the source code using a JavaScript engine. At an eighth step S408, the compiled application code is run on the application server.

Figure 5:
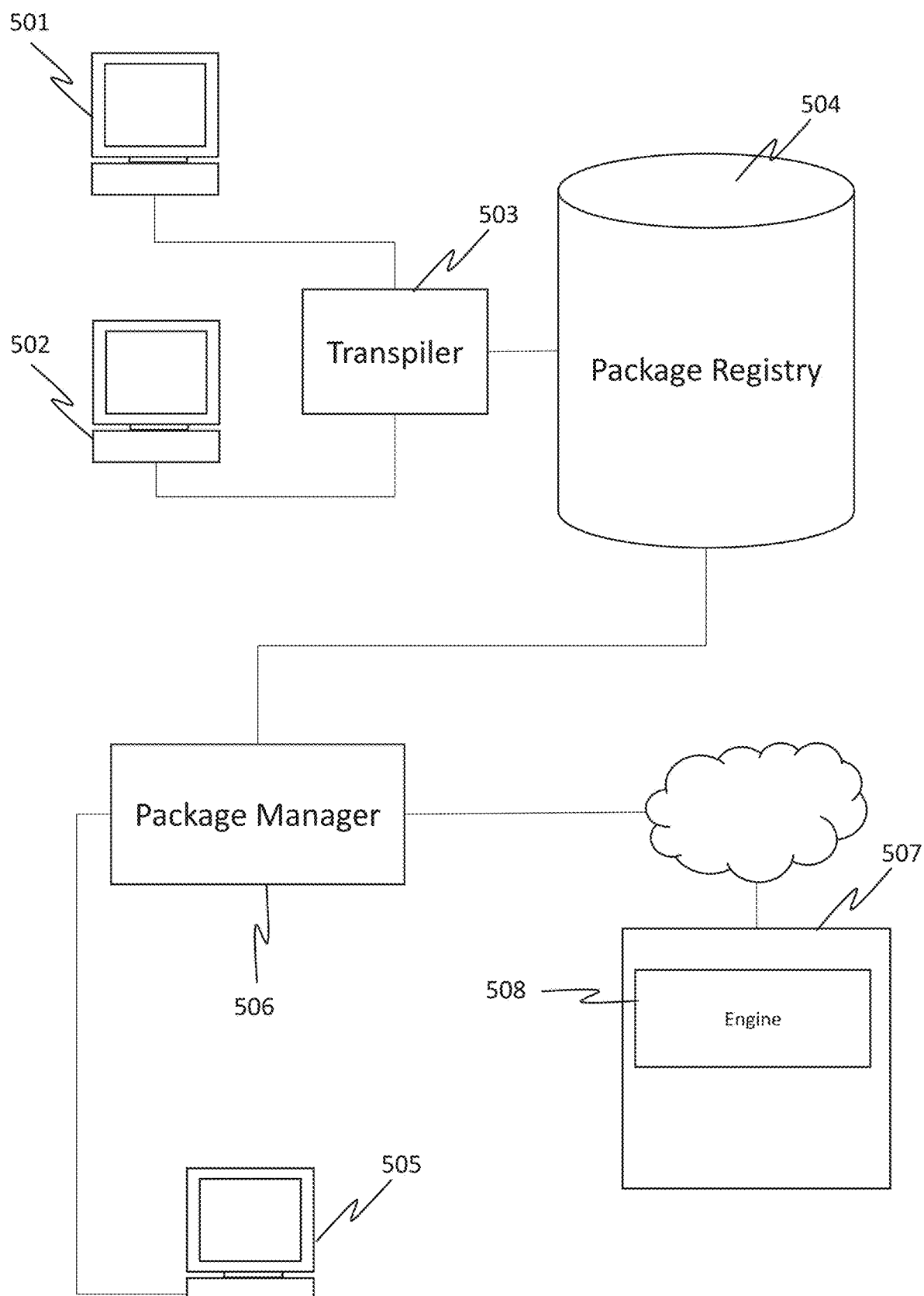

FIG. 5 provides a simplified schematic diagram depicting a system for implementing a technique in accordance with certain embodiments of the invention and for implementing the method described with reference to FIG. 4.

The system comprises a base code developer system 501 comprising apparatus enabling a base code developer to write TypeScript code defining the base code of an application. Typically, the base code developer system 501 comprises one or more computing devices on which is running software providing a code development environment such as an "integrated developer environment" (IDE).

The system further comprises an add-on code developer system 502. The add-on code developer system 502 corresponds to the base code developer system 501. Illustratively, the base code developer system 501 corresponds to apparatus enabling an add-on developer to write TypeScript code defining add-on code for the application, typically comprising one or more computing devices on which running a code development environment such as an "integrated developer environment" (IDE). Although not shown, typically the system may include multiple independent add-on code developer systems, each writing independent add-on code.

As described above, classes defined in the base code written using the base code developer system 502 can be further defined in the add-on code written in the add-on code developer system 502 using a decorator function to implement prototype merging and implementing module augmentation using a declare module instruction.

Base code written using the base code developer system 501 and defining one or more classes, and add-on code written using the add-on code developer system 502 and comprising further definitions of the one or more classes are transpiled from TypeScript to JavaScript by a transpiler 503 and then published to a package registry 504.

The system further includes an application developer system 505. The application developer system corresponds to the base code developer system 501 and add-on code developer system 502 described above, e.g., comprising one or more computing devices on which running a code development environment such as an "integrated developer environment" (IDE). The application developer system allows an application developer to write application assembly directives, including an application manifest file, for implementing a particular instance of an application. As described above, the application manifest file specifies particular add-on code packages from the package registry 504 to include in the deployment of instance of the application. The application developer system 505 is linked to a package manager 506. The application assembly code including the application manifest file is communicated to the package manager 506 which assembles JavaScript source code from the base code and add-on code in the package registry in accordance with the application manifest. This JavaScript source code is communicated to an application server 507 and compiled and loaded by a JavaScript engine 508 running on the application server and an instance of the application is thus deployed on the application server 507.

It will be understood that the component parts of the system described with reference to FIG. 5 can be implemented in any appropriate way known in the art. In certain embodiments, the components parts of the system depicted in FIG. 5 are logical designations and functionality provided by one or more components parts of the system may be provided by a single computing device or across multiple computing devices. For example, in certain embodiments, functionality associated with the transpiler, package registry (e.g., storing code packages) and package manager, may be provided by software running on a suitably programmed computing apparatus provided, for example by an application server or several connected application servers. In certain embodiments, the functionality associated with the transpiler, and/or the package registry and/or package manager may be provided by the same computing apparatus providing functionality associated with one of the base code developer system, add-on code developer system or application code developer system. Such system would include virtual or physical computing devices having processing functionality and memory functionality that execute computer-executable instructions to implement one or more aspects of the identified components or modules.

In certain embodiments, the package manager is adapted to ensure that the code and metadata artefacts of add-on code packages are deployed in separate directories. Once pulled, the artefacts are immutable. They can be replaced as a whole by another version but not modified in situ.

In certain embodiments, when writing add-on code, a convention is observed whereby new elements (e.g., tables, columns, classes, methods, event handlers, etc.) can be added but existing elements are not replaced or deleted.

In certain embodiments, a naming convention is observed when writing add-on code. A unique prefix is assigned to each add-on code developer (e.g., the party responsible for developing an add-on such as a vendor) and each add-on code developer prefixes all their elements added to a class by their prefix followed by a $ sign. If the class definition in the base code does not use a $ sign (except in first position) the likelihood of naming conflicts arising can be avoided.

In examples described above, it has been described how a class defined in code from a base code package can be extended by code in a single add-on code package. However, embodiments of the technique can also be used to extend a class defined in a base code package using definitions from multiple add-on code packages.

Further, the technique can also be used to extend a class defined in a first add-on code package with code from a second add-on code package.

All of the features disclosed in this specification (including any accompanying claims, abstract and drawings), and/or all of the steps of any method or process so disclosed, may be combined in any combination, except combinations where at least some of such features and/or steps are mutually exclusive. Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features. The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

It will be appreciated that various embodiments of the present disclosure have been described herein for purposes of illustration, and that various modifications may be made without departing from the scope of the present disclosure. Accordingly, the various embodiments disclosed herein are not intended to be limiting, with the true scope being indicated by the following claims.

What is claimed is:

1. A computer-implemented method of deploying an application comprising:
   publishing a first code package to a package registry;
   publishing one or more further code packages to the package registry;
   assembling application source code by combining the first code package with one or more of the further code packages from the package registry in accordance with dependencies specified in an application manifest file;
   wherein the first code package comprises code specifying a first definition of a class and at least one of the one or more further code packages comprises code specifying a further definition of the class;
   wherein the further definition of the class comprises:
   prototype merging so that on compilation the first definition of the class and the further definition of the class are loaded as a single class, wherein the prototype merging comprises using a decorator function to incorporate, on loading, the code specifying the first definition of the class with the code specifying the further definition of the class, and
   module augmentation so that the first and further definitions of the class are treated as a single merged class by development tools, wherein the module augmentation comprises using a TypeScript "declare module" instruction;
   the method further comprising:
   generating the first code package and the one or more further code packages in TypeScript; and
   transpiling the first code package and the one or more further code packages into JavaScript prior to publication to the package registry.

2. The method according to claim 1 further comprising loading and running the assembled application source code on an application server.

3. The method according to claim 2, comprising loading and compiling the assembled application source code by a JavaScript Engine.

4. The method according to claim 1, wherein the first code package is a base code package specifying base code associated with the application.

5. The method according to claim 1, wherein the one or more further code packages are add-on code packages specifying add-on code specifying further functionality to be selectively included in instances of the application.

6. A system for deploying an application comprising:
   a computing device having a processing unit and a memory, the computing device executing computer-executable instructions for maintaining a package registry, the package registry comprising a first code package and one or more further code packages and implementing a package manager operable to assemble application source code by combining the first code package with one or more of the further code packages from the package registry in accordance with dependencies specified in an application manifest file;
   wherein the first code package comprises code specifying a first definition of a class and at least one of the one or more further code packages comprises code specifying a further definition of the class; and
   wherein the further definition of the class comprising:
   prototype merging so that on compilation the first definition of the class and the further definition of the class are loaded as a single class, wherein the prototype merging comprises using a decorator function to incorporate, on loading, the code specifying the first definition of the class with the code specifying the further definition of the class, and
   module augmentation so that the first and further definitions of the class which are treated as a single merged class by development tools, wherein the module augmentation comprises using a TypeScript "declare module" instruction;

wherein the first code package and the one or more further code packages correspond to TypeScript; and wherein the computing device further implements a transpiler adapted to transpile the first code package and the one or more further code packages from TypeScript into JavaScript and publish the transpiled first code package and the one or more further code packages to the package registry.

7. The system according to claim 6 further comprising an application server, said application server comprising an engine, wherein the application server is operable to receive the assembled application source code from the package registry and the engine is adapted to load and run the assembled application code.

8. The system according to claim 7, wherein the engine is a JavaScript engine.

9. A computer-implemented method of deploying an application comprising:

publishing a first code package and one or more further code packages to a package registry, wherein the first code package and the one or more further packages correspond to TypeScript and are transpiled into Javascript prior to publication;

combining the first code package with one or more of the further code packages from the package registry in accordance with dependencies specified in an application manifest file;

wherein the first code package comprises code specifying a first definition of a class and at least one of the one or more further code packages comprises code specifying a further definition of the class;

wherein the further definition of the class comprises:

prototype merging so that on compilation the first definition of the class and the further definition of the class are loaded as a single class, wherein the prototype merging comprises using a decorator function to incorporate, on loading, the code specifying the first definition of the class with the code specifying the further definition of the class, and module augmentation so that the first and further definitions of the class are treated as a single merged class by development tools, wherein the module augmentation comprises using a TypeScript "declare module" instruction.

10. The method according to claim 9 further comprising loading and running the assembled application source code on an application server.

11. The method according to claim 9, wherein the one or more further code packages are add-on code packages specifying add-on code specifying further functionality to be selectively included in instances of the application.

\* \* \* \* \*